United States Patent
Yamashita et al.

(10) Patent No.: US 6,903,160 B2
(45) Date of Patent: Jun. 7, 2005

(54) PSEUDOCROSS-LINKING RESIN COMPOSITION, MOLDED MATERIALS, SHEET OR FILM MADE THEREFROM, AND OPTICAL ELEMENTS

(75) Inventors: Yukihiko Yamashita, Ichihara (JP); Kenji Kanemaru, Ichihara (JP); Koichi Saito, Ichihara (JP)

(73) Assignee: Hitachi Chemical Co., Ltd., Tokyo (JP)

( * ) Notice: Subject to any disclaimer, the term of this patent is extended or adjusted under 35 U.S.C. 154(b) by 0 days.

(21) Appl. No.: 10/479,801

(22) PCT Filed: Jun. 5, 2002

(86) PCT No.: PCT/JP02/05537
§ 371 (c)(1),
(2), (4) Date: Dec. 5, 2003

(87) PCT Pub. No.: WO02/098980
PCT Pub. Date: Dec. 12, 2002

(65) Prior Publication Data
US 2004/0152839 A1 Aug. 5, 2004

(30) Foreign Application Priority Data
Jun. 5, 2001 (JP) .......................... 2001-168929

(51) Int. Cl.$^7$ .............................. C08L 83/06
(52) U.S. Cl. ................... 525/100; 525/222; 525/233
(58) Field of Search ................ 525/100, 222, 525/233

(56) References Cited

U.S. PATENT DOCUMENTS 6,512,051 B2 * 1/2003 Chino et al. .............. 525/203

FOREIGN PATENT DOCUMENTS

| JP | 58-167605 | 10/1983 |
| JP | 03-52910 | 3/1991 |
| JP | 2000-129173 | 5/2000 |
| JP | 2000-273319 | 10/2000 |
| JP | 2002-038036 | 2/2002 |
| JP | 2002-105344 | 4/2002 |

OTHER PUBLICATIONS

International Search Report for PCT/JP02/05537 dated Sep. 17, 2002.

* cited by examiner

*Primary Examiner*—Kuo-Liang Peng
(74) *Attorney, Agent, or Firm*—Antonelli, Terry, Stout & Kraus, LLP

(57) ABSTRACT

The invention provides a pseudo cross-link resin composition comprises at least tow polymer molecules; wherein the resin is obtained by mixing a vinylic polymer molecule A that has an atomic group capable of forming an intermolecular hydrogen bond in a molecular side chain and/or at a molecular tail end of the polymer molecule, and a vinylic polymer molecule B that has an atomic group capable of forming an intermolecular hydrogen bond in a molecular side chain and/or in a molecular skeleton of the polymer molecule; wherein the vinylic polymer molecule A is a polymer and/or copolymer that has a carboxyl group or a hydroxyl group in a molecular side chain and/or at a molecular tail end, and the vinylic polymer molecule B is a polymer and/or copolymer having at least one or more nitrogen atom in a molecular side chain and/or a molecular skeleton; wherein the vinylic polymer molecule A and the vinylic polymer molecule B are mixed together, the intermolecular hydrogen bond is formed therebetween, and adding a silicone resin that has a structure represented by the formula 1.

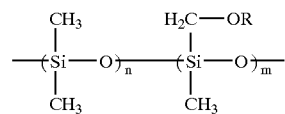

(wherein R is $C_pH_{2p+1}$, p is an integer of 4 or less, and n and m are integers representing the degree of polymerization.

15 Claims, No Drawings

PSEUDOCROSS-LINKING RESIN COMPOSITION, MOLDED MATERIALS, SHEET OR FILM MADE THEREFROM, AND OPTICAL ELEMENTS

The invention pertains to Japanese Patent Application Publication No. 2001-168929 (application date Jun. 5, 2001) filed by the inventors, which is incorporated herein by reference.

TECHNICAL FIELD

The invention relates to a novel pseudo cross-link resin composition and molding material.

BACKGROUND ART

Synthetic resins having various properties have been obtained in recent years as a result of advance of synthetic resin researches. Adding novel performance to existing resins without impairing the resin's own performance has been frequently attempted in such studies.

While acrylic resins and styrene resins as representative synthetic polymer materials have excellent features such as relatively cheap cost, good transparency, relatively easy preparation of polymers having various features from rubber-like polymers to vitreous polymers, and easy modification, there are many problems in strength and improvement in the compatibility between heat resistance and tenacity. Poor tenacity is a general problem common to the acrylic resins, and some methods for solving this problem has been reported. For example, rubber particles have been added in the resin (Japanese Patent Application Laid-Open (JP-A) Nos. 58-167605 and 3-52910). However, the problem of whitening arising by bending the resin (bend processibility) as well as incompatibility between transparency and heat resistance cannot be solved by these methods.

Applications of the acrylic resin as an optical element, particularly an optical elements using short wavelength lasers (around 400 nm), have been attempted by taking advantage of excellent transparency of the acrylic resin. However, the application field of the acrylic resin is restricted since it is deficient in tenacity and heat resistance despite its high transparency. While use of the acrylic resin to optical recording discs have been attempted in recent years, it has been a crucial problem to improve surface smoothness and scratch resistance upon processing into a film or sheet in addition to insufficient heat resistance and tenacity. There have been no acrylic resin that satisfies heat resistance, tenacity, scratch resistance of the surface and surface smoothness of films and sheets while maintaining acrylic resin's own transparency.

Accordingly, resins capable of readily forming blend polymers and exhibiting novel performance, particularly capable of being compatible between these contradictory characteristics, and resin compositions comprising these resins have been desired.

DISCLOSURE OF THE INVENTION

The inventors have found, through intensive studies, that resins could have a pseudo cross-link structure by forming hydrogen bonds in the polymer by interaction among functional groups upon introduction of a combination of the functional groups. It was also found that resin compositions could be readily endowed with novel performance by adding silicone resins to enable the resin compositions in which contradictory characteristics are made compatible to be obtained.

The invention provides the following features.

(1) A pseudo cross-link resin composition comprises at least two polymer molecules; wherein the resin is obtained by mixing a vinylic polymer molecule A that has an atomic group capable of forming an intermolecular hydrogen bond in a molecular side chain and/or at a molecular tail end of the polymer molecule, and a vinylic polymer molecule B that has an atomic group capable of forming an intermolecular hydrogen bond in a molecular side chain and/or in a molecular skeleton of the polymer molecule; wherein the vinylic polymer molecule A is a polymer and/or copolymer that has a carboxyl group or a hydroxyl group in a molecular side chain and/or at a molecular tail end, and the vinylic polymer molecule B is a polymer and/or copolymer having at least one or more nitrogen atom in a molecular side chain and/or a molecular skeleton; wherein the vinylic polymer molecule A and the vinylic polymer molecule B are mixed together, the intermolecular hydrogen bond is formed therebetween, and adding a silicone resin that has a structure represented by the formula 1:

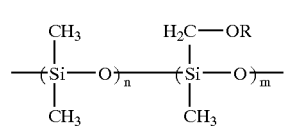

Formula 1

(wherein R is $C_pH_{2p+1}$, p is an integer of 4 or less, and n and m are integers representing the degree of polymerization)

(2) A pseudo cross-link resin composition according to claim 1; wherein the vinylic polymer and/or copolymer that has a carboxyl group in a molecular side chain and/or at a molecular tail end and the vinylic polymer and/or copolymer having at least one or more nitrogen atoms in a molecular side chain and/or in a molecular skeleton are different in their glass transition temperatures; and wherein when these vinylic polymers and/or copolymers are mixed together, the pseudo cross-link type resin composition can be endowed with flexibility, scratch resistance and smoothness improving effect of the surface of the sheet or film.

(3) A pseudo cross-link resin composition according to claim 1; wherein one of the vinylic polymer and/or copolymer that has a carboxyl group or a hydroxyl group in a molecular side chain and/or at a molecular tail end and the vinylic polymer and/or copolymer that has at least one or more nitrogen atoms in a molecular side chain and/or in a molecular skeleton has a glass transition temperature equal to or lower than room temperature and the other one has a glass transition temperature equal to or higher than room temperature; and wherein when these vinylic polymers and/or copolymers are mixed, the pseudo cross-link type resin composition can be endowed with flexibility, scratch resistance and smoothness improving effect of the surface of the sheet or film.

(4) A molding material obtained by molding the pseudo cross-link resin composition according to any one of (1) to (3).

(5) A sheet obtained from the pseudo cross-link resin composition according to any one of (1) to (3).

(6) A film obtained from the pseudo cross-link resin composition according to any one of (1) to (3).

(7) An optical element obtained by the molding material, sheet or film according to any one of (4) to (6).

The invention provides the pseudo cross-link resin composition capable of readily forming a polymer blend, and the film and sheet improved in scratch resistance and smoothness.

The invention also provides the following features.

(2-1) A pseudo cross-link resin composition comprising a resin having intermolecular hydrogen bonds formed therein obtainable by mixing a vinylic polymer molecule A that has an atomic group capable of forming an intramolecular hydrogen bond in a molecular side chain and/or at a molecular tail end of the polymer molecule, and a vinylic polymer molecule B that has an atomic group capable of forming an intramolecular hydrogen bond in a molecular side chain and/or in a molecular skelton of the polymer, or a mixture of these resins;

wherein the vinylic polymer molecule A is a polymer and/or copolymer that has a carboxyl group or a hydroxyl group in a molecular side chain and/or at a molecular tail end, and the vinylic polymer molecule B is a polymer and/or copolymer having at least one or more nitrogen atom in a molecular side chain and/or a molecular skelton;

and adding a silicone resin that has a structure represented by formula 1:

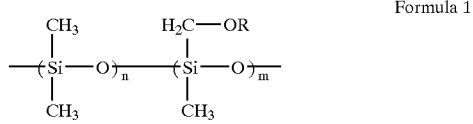

Formula 1

(wherein R is $C_{p}H_{2p+1}$, p is an integer of 4 or less, and n and m are integers representing the degree of polymerization)

(2—2) A pseudo cross-link resin composition comprising a resin having intermolecular hydrogen bonds formed therein obtainable by mixing a vinylic polymer molecule A that has an atomic group capable of forming an intramolecular hydrogen bond at least in any one of molecular side chain and at a molecular tail end of the polymer molecule, and a vinylic polymer molucule B that has an atomic group capable of forming an intramolecular hydrogen bond at least in any one of a molecular side chain and in a molecular skelton of the polymer, or a mixture of these resins;

wherein the vinylic polymer molecule A is a polymer that has a carboxyl group or a hydroxyl group at least in one of a molecular side chain and at a molecular tail end, or a copolymer of these polymers, and the vinylic polymer molecule B is a polymer that has at least one nitrogen atom at least in one of a molecular side chain and a molecular skelton, or a copolymer of these polymers;

and adding a silicone resin that has a structure represented by formula 1:

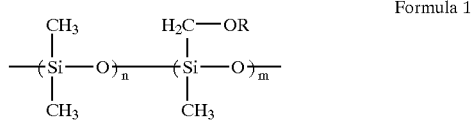

Formula 1

(wherein R is $C_{p}H_{2p+1}$, p is an integer of 4 or less, and n and m are integers representing the degree of polymerization)

(2-3) The pseudo cross-link resin composition according to (2-1) or (2-2) comprising the vinylic polymer molecule A and the vinylic polymer molecule B having different glass transition temperatures with each other, wherein a sheet or film obtained from the pseudo cross-link resin composition has surface scratch resistance of 1.3% or less and surface smoothness of 25 nm or less.

(2-4) The pseudo cross-link resin composition according to any one of (2-1) to (2-3), wherein one of the vinylic polymer molecule A and the vinylic polymer molecule B has a glass transition temperature equal to lower than room temperature and the other has a glass transition temperature equal to or higher than room temperature;

A sheet or film obtained from the pseudo cross-link resin composition has surface scratch resistance of 1.3% or less and surface smoothness of 25 nm or less.

(2-5) A molding material obtained by molding the pseudo cross-link resin composition according to any one of (2-1) to (2-4).

(2-6) A sheet obtained from the pseudo cross-link resin composition according to any one of (2-1) to (2-4).

(2-7) A film obtained from the pseudo cross-link resin composition according to any one of (2-1) to (2-4).

(2-8) An optical element obtained from the pseudo cross-link resin composition according to any one of (2-1) to (2-4).

(2-9) An optical element obtained by the molding material, sheet or film according to any one of (2-4) to (2-7).

The invention provides the pseudo cross-link resin composition capable of readily forming a polymer blend, and the film and sheet are improved in scratch resistance and smoothness.

BEST MODE FOR CARRYING OUT THE INVENTION

Vinylic polymer molecule A in the invention may be a usual vinylic polymer and/or copolymer that has the groups described above. Vinyl monomers are not particularly restricted so long as transparency of the polymer and/or copolymer is not impaired.

Examples of the monomer include acrylic esters such as methyl acrylate, ethyl acrylate, propyl acrylate, n-butyl acrylate, i-butyl acrylate, t-butyl acrylate, pentyl acrylate, n-hexyl acrylate, 2-ethylhexyl acrylate, n-octyl acrylate, dodecyl acrylate, octadecyl acrylate, butoxyethyl acrylate, phenyl acrylate, benzyl acrylate, naphthyl acrylate, glycidyl acrylate, 2-hydroxyethyl acrylate, cyclohexyl acrylate, methylcyclohexyl acrylate, trimethylcyclohexyl acrylate, norbornyl acrylate, norbornylmethyl acrylate, cyanonorbornyl acrylate, isobornyl acrylate, bornyl acrylate, menthyl acrylate, phenethyl acrylate, adamantyl acrylate, dimethyladamanthyl acrylate, tricyclo [5.2.1.0$^{2,6}$]deca-8-yl acrylate, tricyclo[5.2.1.0$^{2,6}$]deca-4-methyl acrylate and cyclodecyl acrylate; methacrylic esters such as ethyl methacrylate, propyl methacrylate, n-butyl methacrylate, i-butyl methacrylate, t-butyl methacrylate, pentyl methacrylate, n-hexyl methacrylate, 2-ethylhexyl methacrylate, n-octyl methacrylate, dodecyl methacrylate, octadecyl methacrylate, butoxyethyl methacrylate, phenyl methacrylate, naphthyl methacrylate, glycidyl methacrylate, cyclopentyl methacrylate, cyclohexyl methacrylate, methylcyclohexyl methacrylate, trimethylcyclohexyl methacrylate, norbornyl methacrylate, norbornylmethl methacrylate, cyanonorbornyl methacrylate, phenylnorbornyl methacrylate, isobornyl methacrylate, bornyl methacrylate, menthyl methacrylate, phenethyl methacrylate, adamantyl methacrylate, dimethyladamantyl methacrylate, tricyclo [5.2.1.0$^{2,6}$]deca-8-yl methacrylate, tricyclo[5.2.1.0$^{2,6}$]deca-4-methyl methacrylate and cyclodecyl methacrylate; aromatic vinyl compounds such as α-methylstyrene, α-ethylstyrene, α-fluorostyrene, α-chlorostyrene, α-bromostyrene, fluorostyrene, chlorostyrene, bromostyrene, methylstyrene and methoxystyrene; metal salts of (meth)acrylic acid such as calcium acrylate, barium acrylate, lead acrylate, tin acrylate, zinc acrylate, calcium methacrylate, barium methacrylate, lead methacrylate, tin methacrylate and zinc methacrylate; unsaturated fatty acids such as acrylic acid and methacrylic acid; vinyl cyanide compounds such as acrylonitrile and methacrylonitrile; and N-methylmaleimide, N-ethylmaleimide, N-propylmaleimide, N-i-propylmaleimide, N-butylmaleimide, N-i-butylmaleimide, N-t-butylmaleimide, N-laurylmaleimide, N-cyclohexylmaleimide, N-benzylmaleimide, N-phneylmaleimide, N-(2-chlorophenyl)maleimide, N-(4-chlorophenyl)maleimide, N-(4-bromophenyl)maleimide, N-(2-methylphenyl)maleimide, N-(2-ethylphenyl)maleimide, N-(2-methoxyphenyl)maleimide, N-(2,4,6-trimethylphenyl)maleimide, N-(4-benzylphenyl)maleimide, N-(2,4,6-tribromophenyl)maleimide and the like. These monomers may be used alone, or as a combination thereof. The monomers are not restricted to those as set forth herein.

Vinylic monomer molecule A according to the invention can be obtained by copolymerizing the polymer and/or copolymer comprising the vinylic monomer above with the following monomers having carboxyl group or hydroxyl group.

Examples of the monomer above include acrylic acid, 2-hydroxyethyl acrylate, 2-hydroxypropyl acrylate, 2-hydroxybutyl acrylate, 2-acryloyloxyethyl succinate, 2-acryloyloxyethyl hexahydrophthalic acid, 2-acryloyloxyethyl-2-hydroxypropyl phthalate, 2-acryloyloxyethyl acid phosphate, 2-hydroxy-3-acryloyloxypropyl acrylate, methacrylic acid, 2-hydroxyethyl methacrylate, 2-hydroxypropyl methacrylate, 2-hydroxybutyl methacrylate, 2-methacryloyloxyethyl succinate, 2-methacryloyloxyethyl hexahydrophthalic acid, 2-methacryloyloxyethyl-2-hydroxypropyl phthalate, 2-methacryloyloxyethyl acid phosphate, 2-hydroxy-3-methacryloyloxypropyl acrylate, vinylbenzoic acid, vinyl benzoate, derivatives thereof and the like.

When the components (components having carboxylic group or hydroxyl group) are copolymerized with other vinyl monomers, the proportion of copolymerization of the components is preferably 2 mol % or more, more preferably 5 mol % or more, and further preferably 5 to 50 mol %, considering the solubility of the copolymer. The monomers are not restricted to those as set forth herein.

A polymerization methods known in the art such as bulk polymerization, suspension polymerization, emulsion polymerization and solution polymerization using the materials above may be applied for producing the vinylic polymer molecule A of the invention.

A polymerization initiator may be used for polymerization. Examples of the polymerization initiator include organic peroxides such as benzoyl peroxide, lauroyl peroxide, di-t-butyl peroxyhexahydroterephthalate, t-butylperoxy-2-ethyl hexanoate, and 1,1-t-butylperoxy-3,3,5-trimethyl cyclohexane; azo compounds such as azobisisobutylonitrile, azobis-4-methoxy-2,4-dimethylvaleronitrile, azobiscyclohexanone-1-carbonitrile and azodibenzoyl; water soluble catalyst such as potassium persulfate and ammonium persulfate; and redox catalysts by a combination of peroxides or persulfates and reducing agents. However, any initiators capable of using for usual radical polymerization may be used without being restricted by those as set forth herein. The polymerization initiator is preferably used in the range of 0.01 to 10% by weight relative to the total weight of the monomer used for producing copolymer A.

Mercaptan compounds, thioglycol, carbon tetrachloride and α-styrene dimer may be added, if necessary, as a molecular weight control agent. However, the agent is not restricted to those as set forth herein.

When the monomers are polymerized by heat polymerization, the polymerization temperature may be appropriately selected in the range of 0 to 200° C., preferably 50 to 120° C.

While the molecular weight of vinylic polymer molecule A is not particularly restricted, the weight average molecular weight (as converted into polystyrene) is preferably in the range of 50,000 to 1,000,000 considering tenacity and heat resistance.

Vinylic polymer molecule B of the invention may be usual vinylic polymer and/or copolymer having the groups above. The same vinyl monomers as used in the vinylic polymer molecule A may be used for the vinylic polymer molecule B.

While the vinylic polymer molecule B of the invention is obtained by introducing a monomer having at least one nitrogen atom into a molecular side chain and/or a molecular skelton of usual vinylic polymers and/or copolymers, the following monomers may be copolymerized during copolymerization of the vinyl monomer for introducing the nitrogen atom in a molecular side chain and/or a molecular skelton.

Examples of the nitrogen containing monomer include (metha)acrylamides such as dimethylaminoethyl acrylate, diethylaminoethyl acrylate, dimethylaminoethyl methacrylate, diethylaminoethyl methacrylate, 2,2,6,6-tetramethyl-N-methylpyrimidyl methacrylate, 2,2,6,6-tetramethyl-N-methylpyrimidyl acrylate, 2,2,6,6-tetramethylpyrimidyl methacrylate, 2,2,6,6-tetramethylpyrimidyl acrylate, dimethylaminoethyl methacrylate, acrylamide, methacrylamide, N-dimethylacrylamide, N-diethylacrylamide, N-dimethylmethacrylamide and N-diethylmethacrylamide; and vinylpyridine, derivatives thereof and the like. However, the monomers are not restricted to those as set forth herein.

The amount of use of the monomer for introducing at least one nitrogen atom in the molecular skelton of the vinylic polymer molecule B by copolymerization is preferably 2 mol % or more, more preferably 5 mol % or more, and further preferably 5 to 50 mol %, relative to the vinyl monomer constituting the principal part of vinylic polymer molecule B. Solubility of the vinylic polymer is reduced when the proportion is less than 2 mol % since the number of the intermolecular hydrogen bond between the vinylic polymer molecules A and B is reduced, and transparency of the resin composition obtained becomes poor. Therefore, the proportion is preferably 2 mol % or more.

Existing polymerization methods such as bulk polymerization, suspension polymerization, emulsion polymerization and solution polymerization using the materials above may be applied for producing the vinylic polymer molecule B of the invention.

A polymerization initiator may be used for polymerization. Examples of the polymerization initiator include organic peroxides such as benzoyl peroxide, lauroyl peroxide, di-t-butyl peroxyhexahydroterephthalate, t-butylperoxy-2-ethyl hexanoate, and 1,1-t-butylperoxy-3,3,5-trimethyl cyclohexane; azo compounds such as azobisisobutylonitrile, azobis-4-methoxy-2,4-dimethylvaleronitrile, azobiscyclohexanone-1-carbonitrile and azodibenzoyl; water soluble catalyst such as potassium persulfate and ammonium persulfate; redox catalysts by a combination of peroxides or persulfates and reducing agents; and the like. However, any initiators capable of using for usual radical polymerization may be used without being restricted by those as set forth herein. The polymerization initiator is preferably used in the range of 0.01 to 10% by weight relative to the total weight of the monomer used for producing a vinylic copolymer molecule B.

Mercaptan compounds, thioglycol, carbon tetrachloride α-styrene dimer and the like may be added, if necessary, as a molecular weight control agent. However, the agent is not restricted to those as set forth herein.

When the monomers are polymerized by heat polymerization, the polymerization temperature may be appropriately selected in the range of 0 to 200° C., preferably 50 to 120° C.

While the molecular weight of vinylic polymer molecule B is not particularly restricted, the weight average molecular weight (as converted into polystyrene) is preferably in the range of 50,000 to 1,000,000 considering tenacity and heat resistance.

The pseudo cross-link resin composition of the invention can be obtained by mixing the vinylic polymer molecule A and the vinylic polymer molecule B.

The pseudo cross-link resin composition according to the invention refers to a resin composition cross-linked with hydrogen bonds. The word "pseudo" mean that the cross-link structure is broken by heat (at below the heat decomposition temperature) or a solvent, and the cross-link structure is restored by lowering the temperature or by removing the solvent.

Any methods including a melt-kneading method and vanish blend method may be used for mixing the vinylic polymer molecule A and the vinylic polymer molecule B.

While the mixing ratio between the two vinylic polymers of the vinylic polymer molecule A and the vinylic polymer molecule B is not particularly restricted so long as the resin composition obtained is secured to be transparent, the vinylic polymers are mixed so that the molar ratio of the atomic groups (preferably the carboxyl group in vinylic polymer molecule A and the nitrogen containing group in the vinylic polymer molecule B) capable of forming hydrogen bonds between the vinylic polymer molecule A and the vinylic polymer molecule B is in the range of 2/1 to 1/2, considering tenacity, heat resistance and transparency.

The vinylic polymer molecule A and the vinylic polymer molecule B are preferably different in their glass transition temperatures. More preferably, one of the vinylic polymers has a glass transition temperature equal to or lower than room temperature and the other vinylic polymer has a glass transition temperature equal to or higher than room temperature.

The pseudo cross-link polymer composition having the construction above may be endowed with heat resistance and flexibility. The resin composition having the glass transition temperatures out of the range as described above cannot be flexible at room temperature with heat deformation. Accordingly, the glass transition temperature of one of the vinylic polymers is preferably +10° C. or less, more preferably 0° C. or less, and the glass transition temperature of the other vinylic polymer is preferably +50° C. or more, more preferably +100° C. or more, although there are any particular problems so long as the grass transition temperature is in the range satisfying the conditions above.

Either the vinylic polymer molecule A or the vinylic polymer molecule B should have a glass transition temperature equal to or lower than room temperature in order to endow the resin composition with flexibility, and the vinylic polymer may be any one of the vinylic polymer molecule A and the vinylic polymer molecule B. The vinylic polymer can be prepared to have a desired glass transition temperature by copolymerizing the vinylic polymer with a monomer that is able to form an arbitrary homopolymer having a glass transition temperature equal to or lower than room temperature (preferably 0° C. or less).

The silicone resin available in the invention has a structure shown by the formula 1.

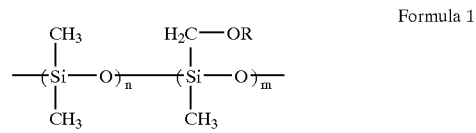

Formula 1

(wherein R is $C_pH_{2p+1}$, p is an integer of 4 or less, and n and m are integers representing the degree of polymerization)

While the silicone resin according to the invention has the structure represented by the formula (1) above, the silicone resins available include dimethylsilicone resin modified with ethoxy group, dimethylsilicone resin modified with methoxy group, dimethylsilicone resin modified with n-propoxy group, dimethylsilicone resin modified with iso-propoxy group, dimethylsilicone resin modified with n-butoxy group, dimethylsilicone resin modified with iso-butoxy group, dimethylsilicone resin modified with t-butoxy group and the like. The dimethylsilicone resin modified with ethoxy group and dimethylsilicone resin modified with methoxy group are preferable.

The degree of polymerization is represented by n and m in the formula 1, and the preferable degree of polymerization (n+m) is 20 to 100,000, more preferably 40 to 50,000, and further preferably 100 to 10,000. Scratch resistance and smoothness of the surface of the film are reduced when the degree of polymerization is less than 20, while transparency tends to be poor when the degree of polymerization exceeds 100,000.

The degree of polymerization (m) of a segment having the ethoxy group, methoxy group, n-propoxy group, iso-propoxy group, n-butoxy group, iso-butoxy group or t-butoxy group is 5 to 100,000, more preferably 10 to 50,000, and further preferably 20 to 1,000. Surface smoothness decreases when the degree of polymerization is less than 5, while transparency tends to be poor when the degree of polymerization exceeds 100,000.

The amount of addition of the silicone resin is preferably 0.0001 to 0.5% by weight, more preferably 0.0005 to 0.1% by weight, and further preferably 0.001 to 0.05% by weight, relative to the amount of the vinylic polymer resin or vinylic polymer resin composition. Scratch resistance and smoothness of the surface of the film tends to be decreased when the amount of addition is less than 0.0001% by weight, while transparency tends to be poor when the amount of addition exceeds 0.5% by weight.

The glass transition temperature is measured as follows.

The resin is evaluated by measuring the glass transition temperature using DSC (differential scanning calorimeter) at a heating rate of 10° C./min.

Hydrogen bonds between the polymer chains are additionally formed by mixing the vinylic polymer molecule A and the vinylic polymer molecule B with addition of the silicone resin represented by the formula (1), in order to obtain a pseudo cross-link resin composition by forming pseudo cross-links and to improve surface scratch resistance and smoothness.

Scratch resistance of the surface of the sheet or film obtained from the pseudo cross-link resin composition is preferably 1.3% or less, more preferably as small as almost zero, as measured by the measuring method described in examples hereinafter. However, surface scratch resistance is usually adjusted in the range of 0.9 to 1.3% since it is difficult to control scratch resistance to be smaller than this range. Likewise, surface smoothness is preferably 25 nm or less, more preferably as small as almost zero. However, surface smoothness is usually adjusted in the range of 0.5 to 5 nm, more preferably 3 to 5 nm, since it is difficult to control surface smoothness to be smaller than this range.

The pseudo cross-link resin composition of the invention can be processed into a film, sheet or molding material. Arbitrary components may be added, if necessary, in the processed film, sheet or molding material in the invention. For example, these additives may be antioxidant such as a phenolic, phosphite or thiolether and a release agent such as an aliphatic alcohol, a fatty acid ester, a phthalic acid ester, triglycerides, a fluorinated surfactant and a higher fatty acid metal salt, as well as a lubricant, plasticizer, antistatic agent, ultraviolent absorption agent, flame retardant and heavy metal inactivating agent.

The film or sheet can be obtained from the resin composition obtained by a melt kneading method or solution cast method followed by evaporation of organic solvents.

The condition of the cast is not particularly restricted, it may be, for example, at 80 to 160° C. in air or in an inert gas atmosphere. Otherwise, the film is peeled after pre-drying under the conditions above, followed by drying at a high temperature of 160 to 350° C. in order to shorten the drying time.

The film or sheet obtained is strong and flexible while being excellent in mechanical properties. Since the film or sheet obtained has a favorable flexibility, it has suitable bend processability as shown in the examples hereinafter. Since the film has a high adhering property to a glass and metal such as aluminum and copper, selection of cast substrates is important for forming the film and sheet.

While a PET film and Teflon film is practically selected as the substrate, it is not restricted thereto provided that the substrate has a low adhesive property to the resin composition.

Examples of the optical element using the film, sheet or molding material of the invention include a DVD disk substrate, DVD disk overcoat film, CD pick-up lense, DVD pick-up lens, Fax lens, LBP lens, olygon mirror and prism.

EXAMPLE

The invention will be described in detail hereinafter with reference to the examples.
<Measuring Method>
(1) Glass Transition Temperature (Tg) and Melting Point (TmM)

Tg and Tm were measured using DSC (DSC 8230 manufactured by Rigaku Corporation) at a heating speed of 10° C./min.
(2) Bend Processability Cracks and the extent of whitening occurring, if any, by bending the film were observed by necked eyes. Films with no cracks and whitening were evaluated as "good".
(3) White Light Transmittance The white light transmittance of the film was measured at a wavelength region of 400 to 800 nm at room temperature using a spectrophotometer (V-570 manufactured by JASCO Corporation).

(4) Observation of Phase Separation

The phase separation occurring by mixing the copolymers was observed by naked eyes.

(5) Birefringence

The birefringence was measured with respect to a film having a thickness of 50 μm using Ellipsometer AEP-100 manufactured by Shimadzu Corporation.

(6) Scratch Resistance

Scratch resistance of the film obtained by the cast method was measured. The film was tilting at 45°, 50 g of sea sand was dropped from an elevation of 5 cm for 1 minutes, and haze of the film at the portion bombarded with sea sand was measured.

(7) Smoothness

Smoothness of the film obtained by the cast method was evaluated by measuring surface roughness using an atomic force microscope (Nanopics 1000 manufactured by Seiko Instruments Inc.).

Abbreviations and manufacturer names of the material use in the invention are listed in Table 1.

TABLE 1

| Name of Product | Abbreviated Name | Name of Maker |
|---|---|---|
| Methyl methacrylate | MMA | Asahi Kasei Chemicals Corporation |
| Butyl methacrylate | BA | Wako Pure Chemical Industries, Ltd. |
| Tricyclo[5.2.2.02,6]deca-8-yl methacrylate | TCDMA | Hitachi Chemical Co., Ltd. |
| Acrylic acid | AA | Wako Pure Chemical Industries, Ltd. |
| Diethylaminoethyl methacrylate | DE | Mitsubishi Rayon Co., Ltd. |
| Vinylpyridine | VP | Wako Pure Chemical Industries, Ltd. |
| 2-acryloyloxyethyl succinate | HOA-MS | Kyoeisha Chemical Co., Ltd. |
| Lauroyl peroxide | LPO | NOF Corporation |
| Azobisisobutylonitrile | AIBN | Wako Pure Chemical Industries, Ltd. |
| Silicone resin A | SH28PA | Dow Corning Toray Silicone Co., Ltd. |
| Silicone resin B | SH29PA | Dow Corning Toray Silicone Co., Ltd. |
| Silicone resin C | SH30PA | Dow Corning Toray Silicone Co., Ltd. |
| Silicone resin D | SH200 | Dow Corning Toray Silicone Co., Ltd. |
| Sea sand | — | Wako Pure Chemical Industries, Ltd. |

The silicone resins represented by the following formula 1a were used as Silicone resin A (SH28PA), Silicone resin B (SH29PA), Silicone resin C (SH30PA) and Silicone resin D (SH200) in Table 1. n, m and R of each silicone resin are shown in Table 2.

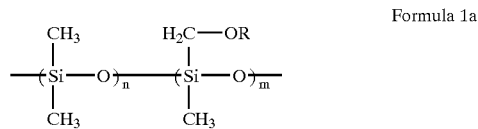

Formula 1a

TABLE 2

| Name of Product | n | m | R |
|---|---|---|---|
| SH28PA | 1000 | 400 | $C_2H_5$ |
| SH29PA | 800 | 600 | $C_2H_5$ |
| SH30PA | 2000 | 800 | $C_2H_5$ |
| SH200 | 2000 | 0 | — |

Example 1

(Production of a Vinylic Polymer Molecule A)

200 g of toluene was introduced into 500 mL four-necked flask as a polymerization solvent, and 38 g of methyl methacrylate (MMA), 900 g of butyl acrylate (BA) and 5 g (6 mol %) of acrylic acid (AA) were scaled. After dissolving 0.4 g of lauroyl peroxide as a polymerization initiator by adding into the monomer mixture, the mixture was added in the flask. Dissolved oxygen was replaced with nitrogen by bubbling nitrogen gas in the mixture for about 1 hour at room temperature, the reaction mixture was heated at 60° C. under a nitrogen atmosphere. A polymer solution, or a toluene solution of vinylic polymer molecule A was obtained by keeping the temperature for about 18 hours. The polymerization ratio was 98% or more.

(Production of Vinylic Polymer Molecule B)

200 g of toluene was introduced into 500 mL four-necked flask as a polymerization solvent, and 88.8 g of methyl methacrylate (MMA), 37.1 g of Tricyclo[$5.2.2.0^{2,6}$]deca-8-yl methacrylate (TCDMA), and 7.1 g (6 mol %) of vinylpyridine were scaled. After dissolving 0.4 g of azobisbutylonitrile as a polymerization initiator by adding into the monomer mixture, the mixture was added in the flask. Dissolved oxygen was replaced thereafter with nitrogen by bubbling nitrogen gas in the mixture for about 1 hour at room temperature, the reaction mixture was heated at 60° C. under a nitrogen atmosphere. A polymer solution, or a toluene solution of vinylic polymer molecule B was obtained by keeping the temperature for about 18 hours. The polymerization ratio was 98% or more.

(Production of Resin Composition)

After mixing the toluene solution of the vinylic polymer molecule A and toluene solution of the vinylic polymer molecule B in 1:1 weight ratio (molar ratio of carboxyl group to amino group of 1/1), 0.005% by weight of silicone resin A was added. The solution was applied on a glass plate and dried by heating to 100° C. over 10 minutes, furthermore 150° C. over 15 minutes, and the solvent was removed to prepare a film with a thickness of about 100 μm for evaluation. The results of evaluation are shown in Table 3.

Example 2

A sample for evaluation was obtained by the same procedure as in Example 1, except that the toluene solution of the vinylic polymer molecule A and toluene solution of the vinylic polymer molecule B were mixed in a weight ratio of 1:2 (molar ratio of carboxylic group to amino group of 1/2). The results of evaluation are shown in Table 3.

Example 3

A sample for evaluation was obtained by the same procedure as in Example 1, except that the toluene solution of the vinylic polymer molecule A and toluene solution of the vinylic polymer molecule B were mixed in a weight ratio of 2:1 (molar ratio of carboxyl group to amino group of 2/1). The results of evaluation are shown in Table 3.

Example 4

A sample for evaluation was obtained by the same procedure as in Example 1, except that 83.1 g of MMA, 35.1 g of BA and 14.8 g of HOA-MS were used for producing the vinylic polymer molecule A. The results of evaluation are shown in Table 3.

Example 5

A sample for evaluation was obtained by the same procedure as in Example 1, except that 85.3 g of MMA, 35.7 g of TCDMA and 12.0 g of DE were used for producing the vinylic polymer molecule B. The results of evaluation are shown in Table 3.

Example 6

A sample for evaluation was obtained by the same procedure as in Example 1, except that the toluene solution of the vinylic polymer molecule A obtained in Example 4 and the toluene solution of the vinylic polymer molecule B obtained in Example 5 were mixed in a proportion of 1:1. The results of evaluation are shown in Table 3.

Example 7

A sample for evaluation was obtained by the same procedure as in Example 1, except that silicone resin B was used. The results of evaluation are shown in Table 3.

Example 8

A sample for evaluation was obtained by the same procedure as in Example 1, except that silicone resin C was used. The results of evaluation are shown in Table 3.

TABLE 3

| Item | Unit | Example 1 | Example 2 | Example 3 | Example 4 | Example 5 | Example 6 | Example 7 | Example 8 |
|---|---|---|---|---|---|---|---|---|---|
| Tg of Polymer A | ° C. | 0 | 0 | 0 | −5 | 0 | −5 | 0 | −0 |
| Tg of Polymer B | ° C. | 107 | 107 | 107 | 107 | 101 | 101 | 107 | 107 |
| Bend Processability | — | Good | Good | Good | Good | Good | Good | Good | Good |
| Phase Separation | — | No Phase Separation | No Phase Separation | No Phase Separation | No Phase Separation | No Phase Separation | No Phase Separation | No Phase Separation | No Phase Separation |
| Transmittance of White Light | % | 92 | 91 | 92 | 92 | 91 | 91 | 92 | 92 |
| Birefringence | nm | −0.7 | −0.5 | −0.4 | −0.6 | −0.5 | −0.4 | −0.6 | −0.5 |
| Scratch Resistance | % | 1.2 | 1.1 | 0.9 | 1.0 | 1.1 | 1.2 | 1.3 | 1.0 |
| Smoothness | nm | 5 | 4 | 3 | 4 | 5 | 3 | 4 | 5 |

Comparative Example 1

A sample for evaluation was obtained by the same procedure as in Example 1, except that the vinylic polymer molecule A was produced by eliminating AA in the vinylic polymer molecule A. The results of evaluation are shown in Table 4.

Comparative Example 2

A sample for evaluation was obtained by the same procedure as in Example 1, except that the vinylic polymer molecule B was produced by eliminating VP in the vinylic polymer molecule B. The results of evaluation are shown in Table 4.

Comparative Example 3

A sample for evaluation was obtained by the same procedure as in Example 1, except that silicone resin D was used in place of silicone resin A. The results of evaluation are shown in Table 4.

Comparative Example 4

A sample for evaluation was obtained by the same procedure as in Example 1, except that no silicone resin was used. The results of evaluation are shown in Table 4.

TABLE 4

| Item | Unit | Comparative Example 1 | Comparative Example 2 | Comparative Example 3 | Comparative Example 4 |
|---|---|---|---|---|---|
| Tg of Polymer A | °C. | 0 | 0 | 0 | −5 |
| Tg of Polymer B | °C. | 107 | 107 | 107 | 107 |
| Bend Processability | — | Good | Good | Good | Good |
| Phase Separation | — | Phase Separation | Phase Separation | No Phase Separation | No Phase Separation |
| Transmittance of White Light | % | 15 | 10 | 91 | 92 |
| Birefringence | nm | Not Measurable | Not Measurable | −0.5 | −0.7 |
| Scratch Resistance | % | Not Measurable | Not Measurable | 0.9 | 1.0 |
| Smoothness | nm | 120 | 154 | 30 | 42 |

What is claimed is:

1. A pseudo cross-link resin composition which comprises at least two polymer molecules,
   obtained by mixing a vinylic polymer molecule A that has an atomic group capable of forming an intermolecular hydrogen bond in a molecular side chain and/or at a molecular tail end of the polymer molecule, and a vinylic polymer molecule B that has an atomic group capable of forming an intermolecular hydrogen bond in a molecular side chain and/or in a molecular skeleton of the polymer molecule;
   wherein the vinylic polymer molecule A is a polymer and/or copolymer that has a carboxyl group or a hydroxyl group in a molecular side chain and/or at a molecular tail end, and the vinylic polymer molecule B is a polymer and/or copolymer having at least one nitrogen atom in a molecular side chain and/or a molecular skeleton;
   wherein when the vinylic polymer molecule A and the vinylic polymer molecule B are mixed together, the intermolecular hydrogen bond is formed therebetween, and adding a silicone resin that has a structure represented by the formula 1,

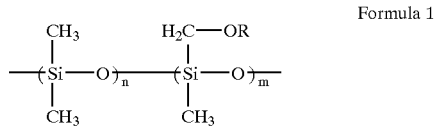

Formula 1

(wherein R is $C_pH_{2p+1}$, p is an integer of 4 or less, and n and m are integers representing the degree of polymerization).

2. A pseudo cross-link resin composition according to claim 1,
   wherein the vinylic polymer and/or copolymer that has a carboxyl group in a molecular side chain and/or at a molecular tail end and the vinylic polymer and/or copolymer having at least one nitrogen atom in a molecular side chain and/or in a molecular skeleton are different in their glass transition temperatures; and
   wherein when these vinylic polymers and/or copolymers are mixed together, the pseudo cross-link resin composition can be endowed with flexibility, scratch resistance and smoothness improving effect of the surface of the sheet or film.

3. A molding material obtained by molding the pseudo cross-link resin composition according to claim 2.

4. A sheet obtained from the pseudo cross-link resin composition according to claim 2.

5. A film obtained from the pseudo cross-link resin composition according to claim 2.

6. A pseudo cross-link resin composition according to according to claim 1,
   wherein one of the vinylic polymer and/or copolymer that has a carboxyl group or a hydroxyl group in a molecular side chain and/or at a molecular tail end and the vinylic polymer and/or copolymer that has at least one nitrogen atom in a molecular side chain and/or in a molecular skeleton has a glass transition temperature equal to or lower than room temperature and the other one has a glass transition temperature equal to or higher than room temperature; and
   wherein when these vinylic polymers and/or copolymers are mixed, the pseudo cross-link resin composition can be endowed with flexibility, scratch resistance and smoothness improving effect of the surface of the sheet or film.

7. A molding material obtained by molding the pseudo cross-link resin composition according to claim 6.

8. A sheet obtained from the pseudo cross-link resin composition according to claim 6.

9. A film obtained from the pseudo cross-link resin composition according to claim 6.

10. A molding material obtained by molding the pseudo cross-link resin composition according to claim 1.

11. An optical element of the molding material according to claim 10.

12. A sheet obtained from the pseudo cross-link resin composition according to claim 1.

13. An optical element of the sheet according to claim 12.

14. A film obtained from the pseudo cross-link resin composition according to claim 1.

15. An optical element of the film according to claim 14.

* * * * *